United States Patent
Weston et al.

(10) Patent No.: US 8,234,228 B2
(45) Date of Patent: Jul. 31, 2012

(54) METHOD FOR TRAINING A LEARNING MACHINE HAVING A DEEP MULTI-LAYERED NETWORK WITH LABELED AND UNLABELED TRAINING DATA

(75) Inventors: Jason Weston, New York, NY (US); Ronan Collobert, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 689 days.

(21) Appl. No.: 12/367,278

(22) Filed: Feb. 6, 2009

(65) Prior Publication Data

US 2009/0204558 A1 Aug. 13, 2009

Related U.S. Application Data

(60) Provisional application No. 61/026,860, filed on Feb. 7, 2008.

(51) Int. Cl.
*G06F 15/18* (2006.01)
(52) U.S. Cl. .......................................... 706/20
(58) Field of Classification Search .................. None
See application file for complete search history.

(56) References Cited

U.S. PATENT DOCUMENTS 7,398,259 B2 * 7/2008 Nugent ........................... 706/33
2008/0021686 A1 * 1/2008 Jojic et al. ...................... 703/11

OTHER PUBLICATIONS

Rosenberg, "Semi-Supervised Training of Models for Appearance-Based Statistical Object Detection Methods", 2004, Carnegie Mellow University, pp. 1-138.*
Casasent et al., "Adaptive-Clustering Optical Neural Net", Jun. 1990, Optical Society of America, vol. 29, pp. 2603-2615.*
Ozbay et al., "A Fuzzy Clustering Neural Network Architecture for Classification of ECG Arrhythmias", May 2005, Elsevier Ltd., Computer in Biology and Medicine vol. 36 Issue 4, pp. 376-388.*

* cited by examiner

*Primary Examiner* — Alan Chen
*Assistant Examiner* — Paulinho E Smith
(74) *Attorney, Agent, or Firm* — Joseph Kolodka; Paul Schwarz

(57) ABSTRACT

The invention includes a method for training a learning machine having a deep multi-layered network, with labeled and unlabeled training data. The deep multi-layered network is a network having multiple layers of non-linear mapping. The method generally includes applying unsupervised embedding to any one or more of the layers of the deep network. The unsupervised embedding is operative as a semi-supervised regularizer in the deep network.

12 Claims, 5 Drawing Sheets

METHOD FOR TRAINING A LEARNING MACHINE HAVING A DEEP MULTI-LAYERED NETWORK WITH LABELED AND UNLABELED TRAINING DATA

RELATED APPLICATION

This application claims the benefit of U.S. Provisional Application No. 61/026,860, filed Feb. 7, 2008, the entire disclosure of which is incorporated herein by reference.

FIELD

The present disclosure relates to machine learning. More particularly, the present disclosure relates to methods and apparatus for improving the error rate of a supervised learning task using unlabeled data.

BACKGROUND

Embedding data into a lower dimensional space or the related task of clustering data, are unsupervised dimensionality reduction techniques that have been intensively studied. Most algorithms relating to same are developed with the motivation of producing a useful analysis and visualization tool.

Recently in the field of semi-supervised learning, the task of improving generalization on a supervised task using unlabeled data, has made use of many of the above-mentioned techniques. For example, nonlinear embedding or cluster representations have been used as features for a supervised classifier, with improved results.

Most of these architectures are disjoint and shallow (four layers or less), by which we mean the unsupervised dimensionality reduction algorithm is trained on unlabeled data separately as a first step, and then its results are fed to a supervised classifier, which has a shallow architecture such as a (kernelized) linear model.

Typically, the quantity of labeled data is insufficient to perform hard artificial intelligence (AI) tasks, such as scene or language understanding, well. In addition, the sharing of information learnt across sub-tasks (multi-task learning) seems a more economical use of data, but necessitates a deep learning network architecture, where presumably all tasks are learnt jointly. A typical example is a multi-layer feed-forward network where the first layers will typically learn levels of feature extraction or processing that are useful to all tasks.

The aim is that the unsupervised method will improve accuracy on the task at hand. However, existing unsupervised methods for deep learning network architectures are somewhat complicated and restricted.

Accordingly, there remains a need for an improved method for training a deep multi-layered learning network, with labeled and unlabeled training data.

SUMMARY

A method is disclosed herein for training a learning machine comprising a deep network including a plurality of layers. The method, in one exemplary embodiment, comprises the steps of applying a regularizer to one or more of the layers of the deep network in a first computer process; training the regularizer with unlabeled data in a second computer process; and training the deep network with labeled data in a third computer process.

The method in another exemplary embodiment comprises the steps of applying a regularizer to one or more of the layers of the deep network; training the regularizer with unlabeled data; and training the deep network with labeled data, wherein at least the regularizer applying and training steps are performed in a first computer process. The deep network training step may be performed in a second computer process or the deep network training step may be performed in the first computer process.

Further disclosed herein is an apparatus for use in discriminative classification and regression. The apparatus comprises an input device for inputting unlabeled and labeled data associated with a phenomenon of interest; a processor; and a memory communicating with the processor. The memory comprises instructions executable by the processor for implementing a learning machine comprising a deep network including a plurality of layers, and training the learning machine by applying a regularizer to one or more of the layers of the deep network; training the regularizer with unlabeled data; and training the deep network with labeled data.

DETAILED DESCRIPTION

The present disclosure describes a method for training a learning machine having a deep multi-layered network, with labeled and unlabeled training data. The deep multi-layered network is a network comprising four or more layers of non-linear mapping. The method generally comprises applying an unsupervised embedding algorithm to any one or more of the layers of the deep network. The unsupervised embedding algorithm is operative as a semi-supervised regularizer in the deep network.

Figure 1:
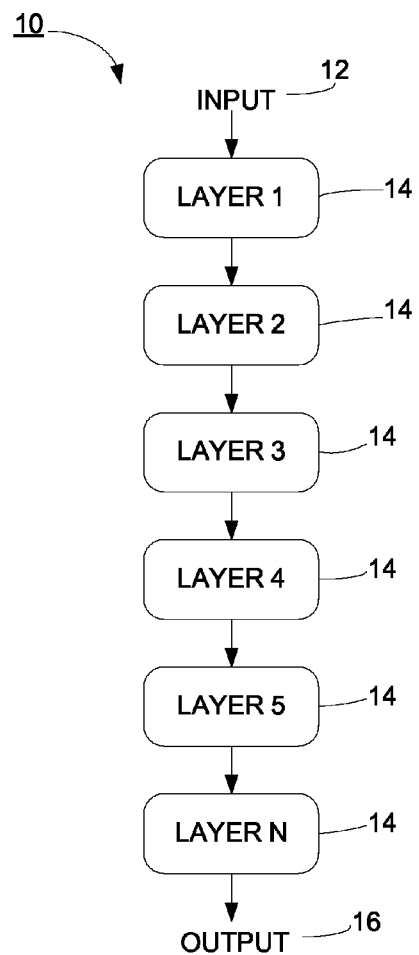
FIG. 1 is a block diagram of an exemplary embodiment of a conventional deep multi-layer network.

In one exemplary embodiment, as shown in the block diagram of FIG. 1, a conventional deep multi-layered network 10 comprises an input layer 12, an output layer 16 and H layers 14 of hidden units. The network 10 is represented by the algorithm:

$$f_i(x) = \sum_{j=1}^{d} w_j^{O,i} h_j^H(x) + b^{O,i} \qquad (1)$$

where typically the $k^{th}$ layer is defined as $$h_i^k(x) = S\left(\sum_j w_j^{k,i} h_j^{H-1}(x) + b^{k,i}\right), k > 1 \quad (2)$$

$$h_i^1(x) = S\left(\sum_j w_j^{1,i} x_j + b^{1,i}\right) \quad (3)$$

and S is a non-linear squashing function. In one exemplary embodiment, the non-linear squashing function comprises a "Hard Tanh" function:

$$S(x) = \begin{cases} 1 & \text{if } x \geq 1 \\ -1 & \text{if } x \leq 1 \\ x & \text{otherwise} \end{cases} \quad (4)$$

Although the above-described network is a conventional, fully connected multilayer network, the methods described herein may also be used with other types of network structures, depending upon the application to be addressed by the network. For example, in sequence and image recognition applications, the method described herein may be used with time delay and convolutional networks (TDNNs and CNNs). In such embodiments, layers are used which apply convolutions on their input that take into account locality information in the data, i.e. they learn features from image patches or windows within a sequence.

As described earlier, the unsupervised embedding algorithm is applied or connected to any of the one or more layers of the deep network. The embedding algorithm labels similar pairs of unlabeled training examples or datapoints (unlabeled training examples that are known to be or likely to be of a same class or type) as positive pairs, and defines or labels dis-similar pairs of unlabeled training examples or datapoints (unlabeled training examples that are known to be or likely to be of a different class or type) as negative pairs. The embedding algorithm is trained to calculate a first distance metric which pushes the similar training examples or datapoints together and a second distance metric which pulls the dis-similar training examples apart.

One general class of unsupervised embedding algorithms that may be used in the present method is described by the following type of optimization problem: given the data $x_i, \ldots, x_U$ find an embedding $f(x_i)$ of each point $x_i$ by minimizing $$\sum_{i,j=1}^{U} L(f(x_i, \alpha), f(x_j, \alpha), W_{ij}) \quad (5)$$

with respect to $\alpha$, subject to a balancing constraint.

The optimization problem of equation 5 has four main components. The first component comprises f(x), which is the embedding that is trying to learn for a given example x. This component is parameterized by $\alpha$. In many techniques, $f(x_i)=f_i$ is a lookup table where each example i is assigned an independent vector $f_i$. The second component comprises L, which is a loss function between pairs of examples. The third component comprises matrix W of weights $W_{ij}$ specifying the similarity or dissimilarity between examples $x_i$ and $x_j$. This component is supplied in advance and serves as a kind of label for the loss function. The fourth component comprises an optional balancing constraint, that is often used so the embedding does not collapse to a single point, or expand to infinity.

In one exemplary embodiment, the embedding algorithm may comprise $$L(f_i, f_j, W_{ij}) = \begin{cases} \frac{f_i f_j}{\|f_i\| \|f_j\|} & \text{if } W_{ij} = 1, \\ \frac{f_i f_j}{\|f_i\| \|f_j\|} & \text{if } W_{ij} = 0. \end{cases} \quad (6)$$

The embedding algorithm of equation 6 encourages similar examples to have a similar direction (independent of magnitude).

In another exemplary embodiment, the embedding algorithm may comprise:

$$L(f_i, f_j, W_{ij}) = \begin{cases} \|f_i - f_j\|^2 & \text{if } W_{ij} = 1, \\ \max(0, m - \|f_i - f_j\|^2) & \text{if } W_{ij} = 0. \end{cases} \quad (7)$$

The embedding algorithm of equation 7 encourages similar examples to be close, and dissimilar ones to have a distance of at least m from each other.

Neither one of the embedding algorithms of equations 6 and 7 includes a balancing constraint. This is because the solution of equation 6 is independent of magnitude and because the margin constraint of equation 7 inhibits a trivial solution. These embedding algorithms are relatively easy to minimize by a stochastic gradient descent.

Figure 2:
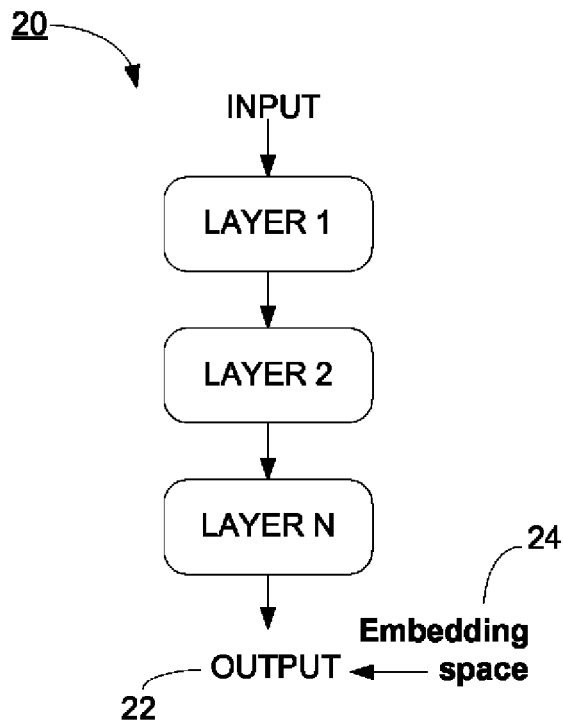
FIG. 2 is a block diagram of an exemplary embodiment of a deep multi-layer network according to the present disclosure.

The unsupervised embedding algorithm may be applied to one or more layers of the deep network. FIG. 2 is a block diagram of one exemplary embodiment of a deep network 20 with unsupervised embedding 24 applied to an output 22 of the deep network 20. The method of applying unsupervised embedding 24 to the output 22 of the deep network 20 may be algorithmically described as:

$$\sum_{i=1}^{L} H(y_i f(x_i)) + \lambda \sum_{i,j=1}^{L+U} L(f(x_i), f(x_j), W_{ij}). \quad (8)$$

Figure 3:
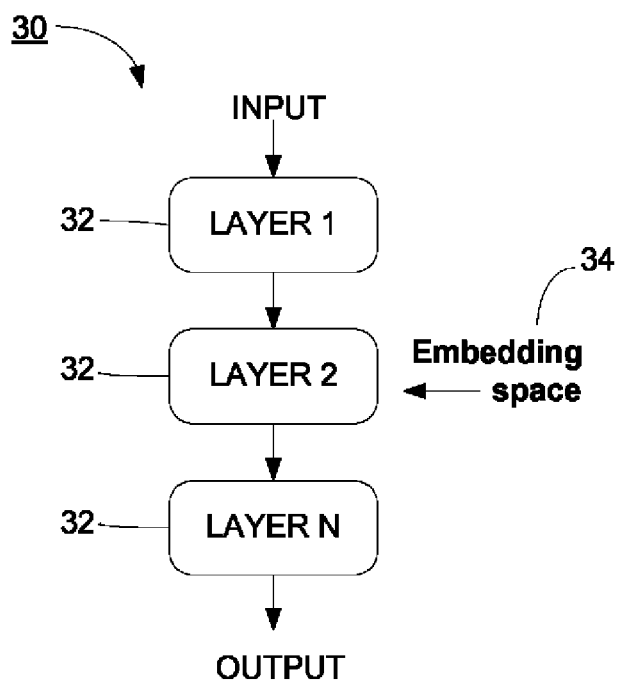
FIG. 3 is a block diagram of another exemplary embodiment of a deep multi-layer network according to the present disclosure.

FIG. 3 is a block diagram of another exemplary embodiment of a deep network 30 with unsupervised embedding 34 applied directly to a $k^{th}$ hidden layer 32 of the deep network 30. The method of applying unsupervised embedding 34 directly to a $k^{th}$ hidden layer 32 of the deep network 30 may be algorithmically described as:

$$\sum_{i=1}^{L} H(y_i f(x_i)) + \lambda \sum_{i,j=1}^{L+U} L(f^k(x_i), f^k(x_j), W_{ij}), \quad (9)$$

where $f^k(x)=(h_1^k(x), \ldots, h_N^k(x))$ is the output of the network up to the $k^{th}$ hidden layer.

Figure 4:
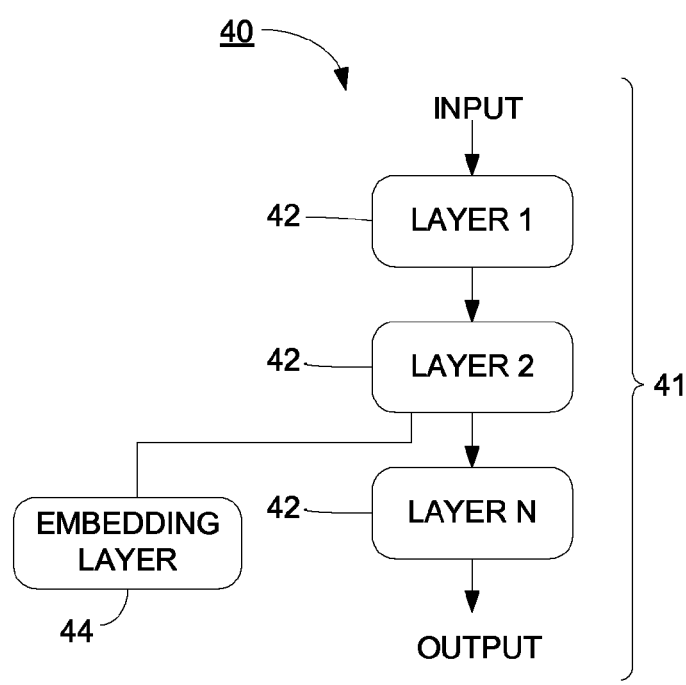
FIG. 4 is a block diagram of a further exemplary embodiment of a deep multi-layer network according to the present disclosure.

FIG. 4 is a block diagram of a further exemplary embodiment of a network 40 wherein unsupervised embedding is applied to a deep network 41 as a separate layer 44 so that the deep network 41 shares its first k layers 42 (weights) with the embedding layer 44 but where the embedding layer 44 has a new final set of weights. The method of applying unsupervised embedding as a separate layer 44 within the deep network 40 may be algorithmically described as:

$$g_i(x) = \sum_j w_j^{AUX,i} h_j^k(x) + b^{AUX,i}. \quad (10)$$

The network 40 is trained to embed unlabeled data simultaneously as the deep network 41 is trained on labeled data.

All the loss functions (embedding algorithms) are pairwise. By defining:

$$c(x,x')=\operatorname{sign}(D(f(x),f(x'))+b), \quad (11)$$

a classifier can be provided that returns whether two examples are similar or not, which can be trained with labeled examples. Here, the model f(x) may be used as before, and a distance measure D has to be defined, which can either be: (i) a Euclidean distance, (ii) a (normalized) inner product or (iii) be a trainable function itself. When in this maimer, the semi-supervised regularizer is operative an auxiliary classification task.

The method may be generalize further in the case where there are k neighbors rather than a pair of examples to consider, a situation that comes up naturally in embedding sequence data. For example, given unlabeled text of the English language one can think of the words in any given sentence or window as being neighbors, and a random collection of k words as being a dissimilar set. In the present method, $$c(x^1, \ldots, x^k)=\operatorname{sign}(D(f(x^1), \ldots, f(x^k))+b) \quad (12)$$

may be defined where D is now a function operating on the set of examples which returns whether the set are similar or not.

Figure 5:
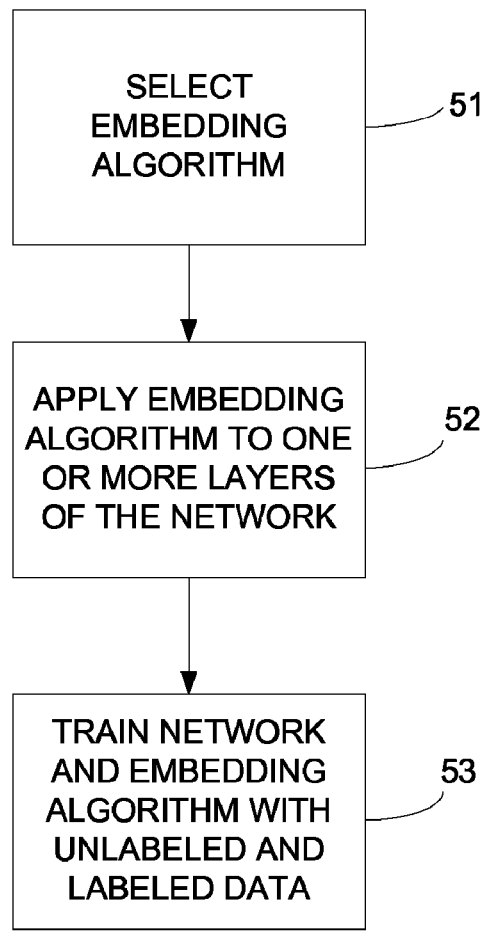
FIG. 5 is a flowchart of an exemplary embodiment of a method for training a learning machine having a deep multi-layer network architecture with labeled and unlabeled training data, according to the present disclosure.

FIG. 5 is a flowchart of an exemplary embodiment of the method for training a learning machine having a deep multi-layer network architecture with labeled and unlabeled training data. The method commences in step 51, wherein an appropriate unsupervised embedding algorithm is selected. The embedding algorithm is applied to a selected one or more layers of the network in step 52 as an auxiliary task. In step 53, the network and the embedding algorithm are simultaneously trained with labeled and unlabeled training examples or datapoints, respectively to minimize (optimize) the loss functions of the network and embedding algorithm. In one exemplary embodiment, training may be by stochastic gradient descent. In other exemplary embodiments, the training may be by batch gradient descent.

The methods of the present disclosure improves the accuracy of the supervised training task, i.e., the training of the deep multi-layer network with labeled examples or data. The method may be used for training deep multi-layer networks that are utilized for analyzing phenomenons of interest including, without limitation, human language, written text, an object viewed by a camera, financial information, and any other phenomenon commonly addressed in natural language processing, syntactic pattern recognition, search engines, medical diagnosis, bioinformatics, brain-machine interfaces and cheminformatics, financial analysis, speech and handwriting recognition, and object recognition in computer vision, game playing and robot locomotion.

The methods described herein may be executed in software, hardware, a combination of software and hardware, or in other suitable executable implementations. The methods implemented in software may be executed by a processor of a computer system or by one or more processors of one or more associated computers or computer systems connected to the computer system.

The computer system may include, without limitation, a mainframe computer system, a workstation, a personal computer system, a personal digital assistant (PDA), or other device or apparatus having at least one processor that executes instructions from a memory medium.

The computer system(s) may include one or more memory mediums on which one or more computer programs or software components implementing the methods described herein may be stored. The one or more software programs which are executable to perform the methods described herein, may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

Figure 6:
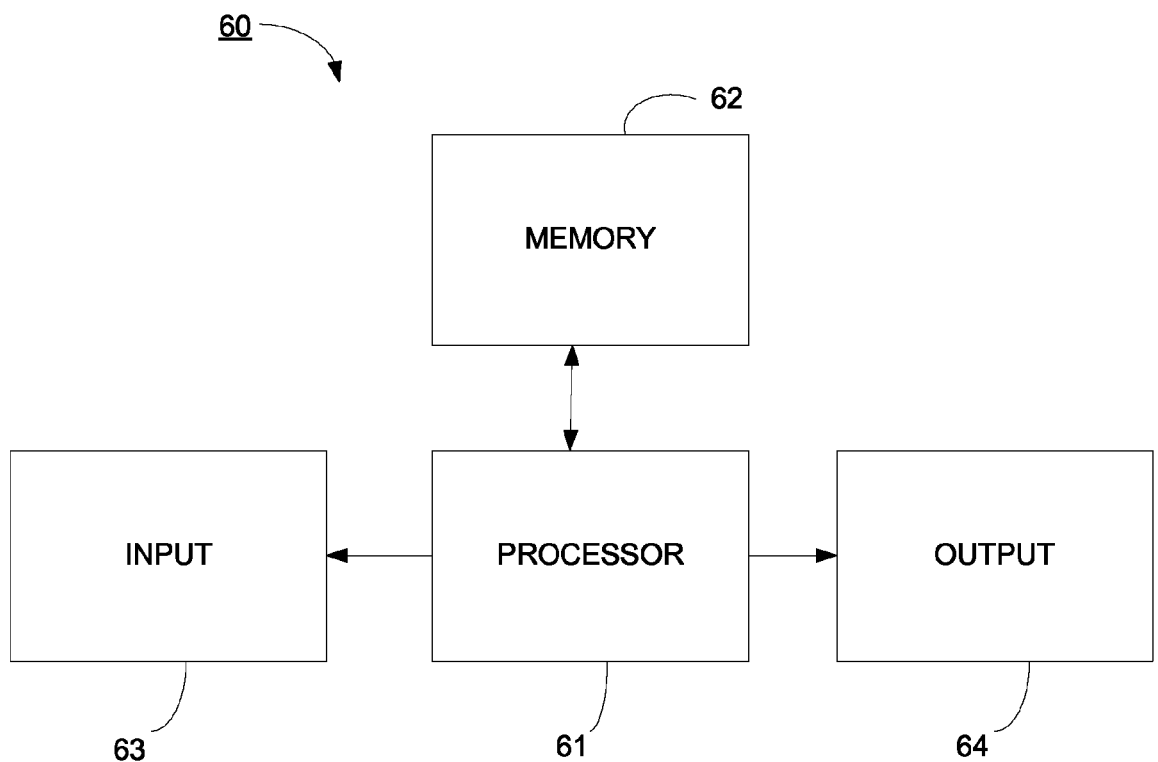
FIG. 6 is a block diagram of an exemplary embodiment of a computer system for performing the methods described herein.

FIG. 6 is a block diagram of an exemplary embodiment of a computer system 60 which may be used for performing the methods described herein. The computer system 60 includes a processor 61, a memory 62 for storing one or more programs which are executable by the processor for performing the methods described herein, an input 63 for receiving input data (e.g., the unlabeled and labeled training data), and an output for 64 for outputting data (e.g., a predicted class label).

While exemplary drawings and specific embodiments have been described and illustrated herein, it is to be understood that that the scope of the present invention is not to be limited to the particular embodiments discussed. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. A method for training a learning machine comprising a deep network including a plurality of layers, the method comprising the steps of:
   applying a regularizer to one or more of the layers of the deep network in a first computer process;
   training the regularizer with unlabeled data in a second computer process; and
   training the deep network with labeled data in a third computer process;
   wherein the regularizer comprises a layer separate from the one or more layers of the network.

2. The method of claim 1, wherein the regularizer training step includes the steps of:
   labeling similar pairs of the unlabeled data as positive pairs; and
   labeling dis-similar pairs of the unlabeled data as negative pairs.

3. The method of claim 2, wherein the regularizer training step further includes the steps of:
   calculating a first distance metric which pushes the positive pairs of data together; and
   calculating a second distance metric which pulls the negative pairs of data apart.

4. The method of claim 1, wherein the regularizer training step is performed by stochastic gradient descent.

5. The method of claim 1, wherein the one or more layers with the applied regularizer comprises a hidden layer of the network.

6. The method of claim 1, wherein the one or more layers with the applied regularizer comprises an output layer of the network.

7. The method of claim 1, wherein the one or more layers with the applied regularizer comprises an input layer of the network.

8. An apparatus for use in discriminative classification and regression, the apparatus comprising:
- an input device for inputting unlabeled and labeled data associated with a phenomenon of interest;
- a processor; and
- a memory communicating with the processor, the memory comprising instructions executable by the processor for implementing a learning machine comprising a deep network including a plurality of layers and training the learning machine by:
  - applying a regularizer to one or more of the layers of the deep network;
  - training the regularizer with unlabeled data; and
  - training the deep network with labeled data;

wherein the regularizer applying, the regularizer training and the deep network training are performed in separate computer processes.

9. The apparatus of claim 8, wherein at least two of the regularizer applying, regularizer training, and the deep network training are performed as a single computer process.

10. The method of claim 8, wherein the regularizer training step includes the step of assigning weights to pairs of unlabeled data to indicate whether they are similar or dis-similar.

11. The method of claim 10, wherein weights are in a binary form.

12. A method for training a learning machine comprising a deep network including a plurality of layers, the method comprising the steps of:
- applying a regularizer to one or more of the layers of the deep network in a first computer process;
- training the regularizer with unlabeled data in a second computer process; and
- training the deep network with labeled data in a third computer process;

wherein at least one of the regularizers comprises a layer separate from the one or more layers of the network.

* * * * *